US006471592B2

United States Patent
Tanaka

(10) Patent No.: US 6,471,592 B2
(45) Date of Patent: *Oct. 29, 2002

(54) EXTERNAL OPERATION DEVICE AND ENTERTAINMENT SYSTEM

(75) Inventor: Makoto Tanaka, Tokyo (JP)

(73) Assignee: Sony Computer Entertainment Inc., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/313,529

(22) Filed: May 17, 1999

(65) Prior Publication Data

US 2002/0061777 A1 May 23, 2002

(30) Foreign Application Priority Data

May 18, 1998 (JP) .............................. 10-135581

(51) Int. Cl.[7] ................................................ A63F 13/08
(52) U.S. Cl. ..................................... 463/37; 273/148 B
(58) Field of Search ............................... 463/36–38, 40, 463/46–47; 273/148 B; 385/115–116, 120–121, 100–108, 88, 52, 14, 2, 8, 31; 359/326–332, 154, 438, 618, 162; 315/1

(56) References Cited

U.S. PATENT DOCUMENTS

| 4,393,493 A | * | 7/1983 | Edwards ........................ 370/16 |
| 4,501,424 A | * | 2/1985 | Stone et al. ............... 273/148 R |
| 4,504,846 A | * | 3/1985 | Chappell et al. ............... 357/12 |
| 4,563,162 A | * | 1/1986 | Ishimoto ..................... 446/175 |
| 4,895,426 A | * | 1/1990 | Pinson ...................... 350/96.23 |
| 4,991,975 A | * | 2/1991 | Alferness et al. ............... 370/4 |
| 5,018,142 A | * | 5/1991 | Simcoe et al. ............... 370/112 |
| 5,040,242 A | * | 8/1991 | Tsuchiya et al. ............ 359/154 |
| 5,067,787 A | * | 11/1991 | Gillham et al. ................ 385/50 |
| 5,083,874 A | * | 1/1992 | Aida et al. ...................... 385/24 |
| 5,104,243 A | * | 4/1992 | Harding ........................ 385/84 |
| 5,113,403 A | * | 5/1992 | Block et al. ................. 359/152 |
| 5,283,680 A | * | 2/1994 | Okugawa et al. ........... 359/171 |
| 5,390,272 A | * | 2/1995 | Repta et al. ................. 385/100 |
| 5,493,406 A | * | 2/1996 | Sawaki et al. .............. 356/73.1 |
| 5,607,157 A | * | 3/1997 | Nagashima ............. 373/148 B |
| 5,664,035 A | * | 9/1997 | Tsuji et al. ..................... 385/24 |
| 5,784,513 A | * | 7/1998 | Kuribayashi et al. .......... 385/88 |
| 5,796,884 A | * | 8/1998 | Wingo .......................... 385/16 |
| 5,852,694 A | * | 12/1998 | Kimura et al. ................. 385/78 |
| 5,937,125 A | * | 8/1999 | Creswick et al. .............. 385/88 |
| 6,086,265 A | * | 7/2000 | Kuribayashi et al. .......... 385/92 |

FOREIGN PATENT DOCUMENTS

EP 0 359 985 3/1990
EP 0 677 756 10/1995

OTHER PUBLICATIONS

Saleh, Bahaa E. A. and Teich Malvin Carl, Fundamentals of Photonics, Wiley–Interscience, pp. 874–917.*

* cited by examiner

*Primary Examiner*—Valencia Martin-Wallace
*Assistant Examiner*—Scott E. Jones
(74) *Attorney, Agent, or Firm*—Katten Muchin Zavis Rosenman

(57) ABSTRACT

This invention concerns an external operation device and makes it possible to conduct communication at a faster rate than previously. The operation means is connected to the operation object via an optical fiber and by converting the electrical signals of the transmission object to optical signals during communication and transmitting said optical signals via optical fibers, even if the frequency is high, no electromagnetic-wave noise is generated as happens when the operation means is connected to the operation object via electrically conductive wires. Thus there is no need to limit the frequency of the optical signals, that is, the communication speed, and therefore communication can be done at a faster rate than previously.

11 Claims, 9 Drawing Sheets

CIRCUIT COMPOSITION OF GAME SYSTEM

CROSS-SECTIONAL VIEW OF CABLE

CROSS-SECTIONAL VIEW OF CONVENTIONAL CABLE

CROSS-SECTIONAL VIEW OF CONTROLLER MAIN UNIT ACCORDING TO ANOTHER EMBODIMENT

OVERALL COMPOSITION OF GAME SYSTEM

CIRCUIT COMPOSITION OF GAME SYSTEM

CROSS-SECTIONAL VIEW OF CABLE

CABLE TWISTING TESTING DEVICE

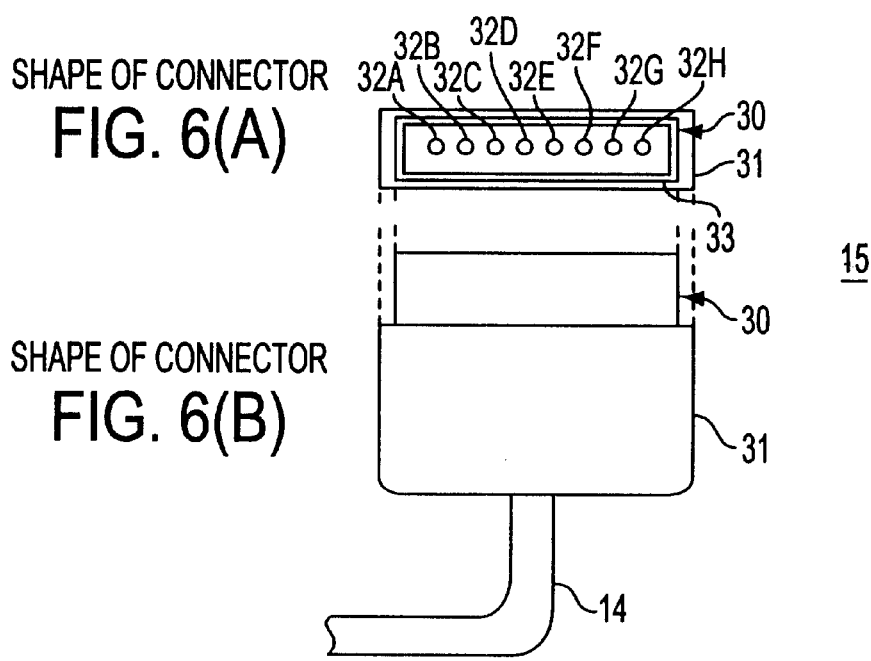
SHAPE OF CONNECTOR
FIG. 6(A)
SHAPE OF CONNECTOR
FIG. 6(B)
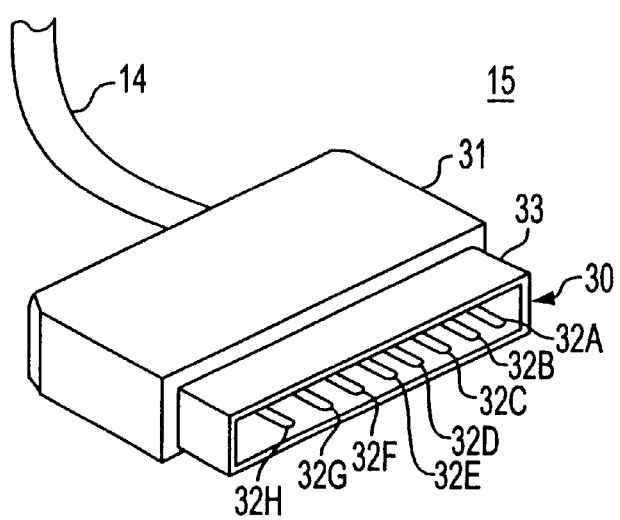
APPEARANCE OF CONNECTOR
FIG. 7

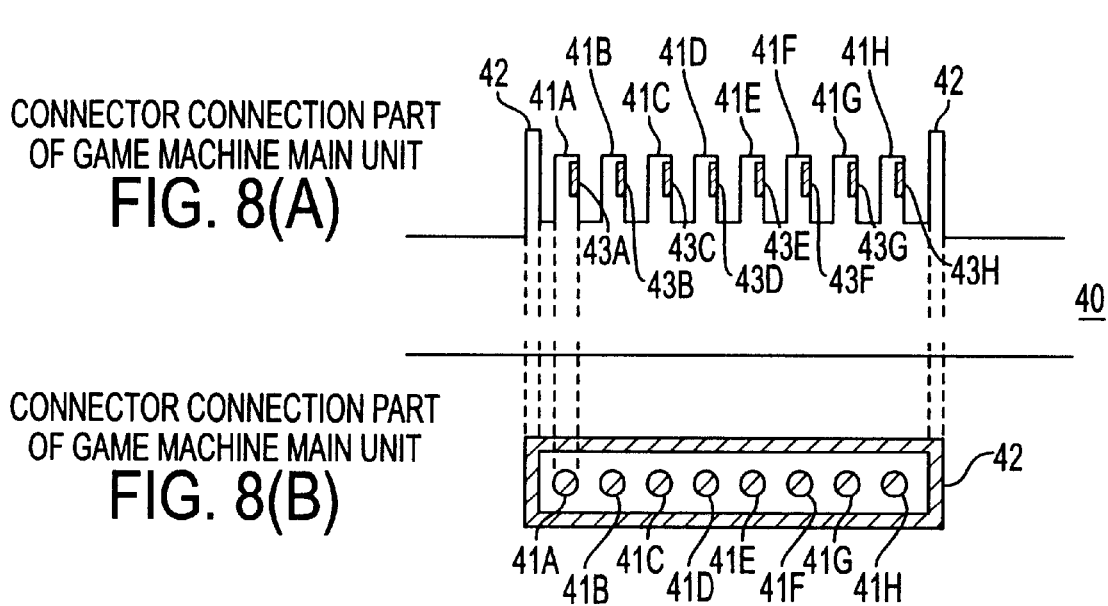
CONNECTOR CONNECTION PART OF GAME MACHINE MAIN UNIT
FIG. 8(A)
CONNECTOR CONNECTION PART OF GAME MACHINE MAIN UNIT
FIG. 8(B)
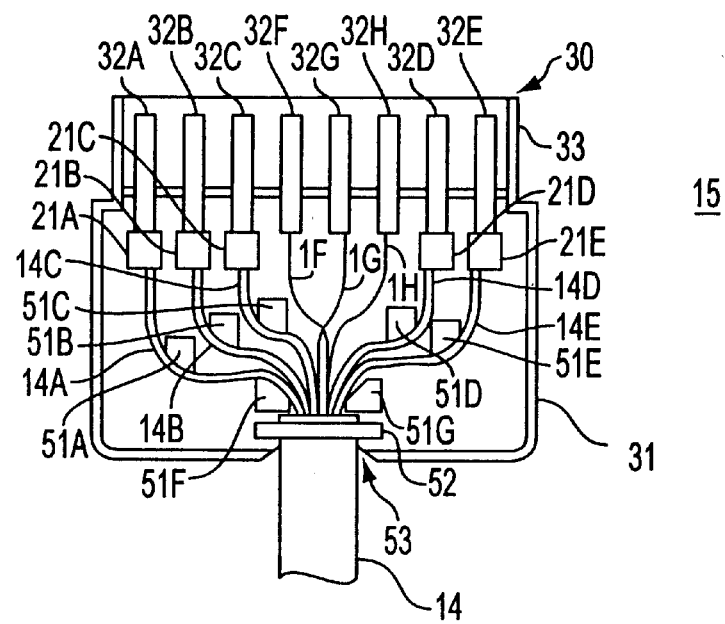
CROSS-SECTIONAL VIEW OF CONNECTOR
FIG. 9

TENSILE STRENGTH TESTING DEVICE

BENDING STRENGTH TESTING DEVICE

SHAPE OF CONTROLLER MAIN UNIT

CROSS-SECTIONAL VIEW OF CONTROLLER MAIN UNIT

TENSILE STRENGTH TESTING DEVICE

BENDING STRENGTH TESTING DEVICE

CROSS-SECTIONAL VIEW OF CABLE ACCORDING TO ANOTHER EMBODIMENT

CROSS-SECTIONAL VIEW OF CONNECTOR ACCORDING TO ANOTHER EMBODIMENT

EXTERNAL OPERATION DEVICE AND ENTERTAINMENT SYSTEM

FIELD OF THE INVENTION

This invention relates to an external operation device that is suitable as a game controller connected to a game machine main unit.

BACKGROUND OF THE INVENTION

Conventionally, with game controllers the game is played while communicating with the game machine main unit by sending the operation information input from the user and informing the user by receiving feedback information sent from the game machine main unit. The game controller has a controller main unit as an operation means, a cable as a data transmission means, and a connector for connecting the cable to the game machine main unit, and data is exchanged in sequence through the cable and connector.

A conventional cable cross-sectional view is shown in FIG. 1. This cable has multiple electrically conductive wires 1A–1H for conveying electrical signals; among them, electrical conductive wire 1A is arranged on the central axis of the cable, and electrically conductive wires 1B–1G are arranged around it so as to be adjacent to this electrically conductive wire 1A. The periphery of these electrically conductive wires 1B–1G is covered with electrically conductive wire 1H, and the periphery of electrically conductive wire 1H is covered by vinyl cover 1I, thereby forming a rodlike shape.

The periphery of each of electrically conductive wires 1A–1G is covered with an insulating substance, preventing them from coming into contact with each other and shorting. The cable is covered with mesh-woven electrically conductive wire 1H that gives the periphery of electrically conductive wires 1A–1G a cylindrical shape, and its periphery in turn is covered with vinyl cover 1I, which is an insulating substance, thereby protecting the interior of cable from external physical forces and electromagnetic-wave noise.

A serial communication method for avoiding the effects due to the noise from outside is adopted as the communication method between the game machine main unit and the controller main unit. Generally with a serial communication method, in many cases one electrically conductive wire each is provided for sending and receiving data, and three electrically conductive wires are provided for controlling the communication. Therefore in the cable, electrically conductive wires 1A and 1B are taken as electrically conductive wires for sending and receiving data, and electrically conductive wires 1C–1E are taken as electrically conductive wires for controlling the communication.

Electrically conductive wire 1A is an electrically conductive wire for transmitting data RxD from the controller main unit to the game machine main unit, and electrically conductive wire 1B is an electrically conductive wire for transmitting data TxD from the game machine main unit to the controller main unit. Electrically conductive wire 1C is an electrically conductive wire for transmitting communication standard clock SCK from the game machine main unit to the controller main unit, electrically conductive wire 1D is an electrically conductive wire for transmitting communication enable signal DTR from the game machine main unit to the controller main unit, and electrically conductive wire 1E is an electrically conductive wire for transmitting communication completion signal DSR from the controller main unit to the game machine main unit.

Electrically conductive wire 1F is an electrically conductive wire for an 8-V power source that operates the lamps, etc. formed on the controller main unit, electrically conductive wire 1G is an electrically conductive wire for power source Vcc that determines the signal level of logical level "1," and electrically conductive wire 1H is an electrically conductive wire for grounding line GND that determines the signal level of logical level "0."

In cables such as shown in FIG. 1, direct current flows in electrically conductive wires 1F–1H, while high-frequency alternating current flows in electrically conductive wires 1A–1E. Therefore, no noise due to electromagnetic waves (hereafter called electromagnetic-wave noise) arises from electrically conductive wires 1F–1H, but electromagnetic-wave noise does arise from electrically conductive wires 1A–1E. A number of adverse effects have been pointed out concerning this noise, and the upper limit for the level of its occurrence is strictly prescribed by domestic and international standards.

For this reason, in such cables the electromagnetic-wave noise is reduced by covering the periphery of electrically conductive wires 1A–1E with mesh-woven electrically conductive wire 1H, and in turn covering the periphery of electrically conductive wire 1H with vinyl cover 1I, which is made of an insulating substance. However, because this is unable to sufficiently reduce the electromagnetic-wave noise, in general the generation of electromagnetic-wave noise is avoided by putting a noise shield on cable 1.

The level of occurrence of electromagnetic-wave noise increases as the frequency increases but the capacity of a noise shield is limited, and it is unable to suppress electromagnetic-wave noise above a certain level. Therefore even if cable 1 is fitted with a noise shield, as the frequency of the alternating current flowing in electrically conductive wires 1A–1E increases and electromagnetic-wave noise beyond a certain level is generated, the limit of the noise shield is exceeded, and electromagnetic-wave noise can no longer be suppressed.

Thus there has been the problem that in order to prevent the generation of electromagnetic-wave noise in cable 1, one must limit the frequency of the electric current, that is, the communication speed, and high-speed communication cannot be done. Because the current flowing in electrically conductive wires 1A–1H becomes attenuated as said electrically conductive wires 1A–1H become longer, there has been the problem that there is a limit to the length of electrically conductive wires 1A–1H, that is, of cable 1.

SUMMARY OF THE INVENTION

This invention provides an external operation device that provides communication at higher speed than was previously available.

The invention provides an operation device which converts electrical signals of a transmission object input in accordance with operation by the user to optical signals by an internal electro-optical signal converter and outputs the optical signals to the operation object. Optical signals transmitted from the operation object are converted to electrical signals by the electro-optical signal converter which outputs the signals to the outside information in accordance with the electrical signals. An optical fiber, one end of which is attached to the operation device transmits optical signals between the operation device and the operation object. A connection means is provided on the other end of the optical fiber and is detachably connected to the operation object which converts optical signals transmitted from the operation device via the optical fiber to electrical signals by an internal electro-optical signal converter and outputs the electrical signals to the operation object, and converts electrical signals supplied from the operation object to optical signals by the electro-optical signal converter and outputs the optical signals to the operation device.

By connecting the operation device to the operation object via an optical fiber and during communication, converting the electrical signals of the transmission object to optical signals and transmitting the optical signals via the optical fiber, electromagnetic-wave noise during communication is not generated, and there is no need to limit the frequency of the optical signals. That is, the communication speed, as there would be if the-operation means were connected to the operation object via electrically conductive wires.

BRIEF DESCRIPTION OF THE DRAWINGS

FIG. 6 shows the shape of the cable connector;

FIG. 7 shows the external appearance of the cable connector;

FIG. 8 shows the connector connection part of the game machine main unit;

FIG. 9 shows a cross-section of the connector;

DETAILED DESCRIPTION OF THE PREFERRED EMBODIMENT

Figure 2:
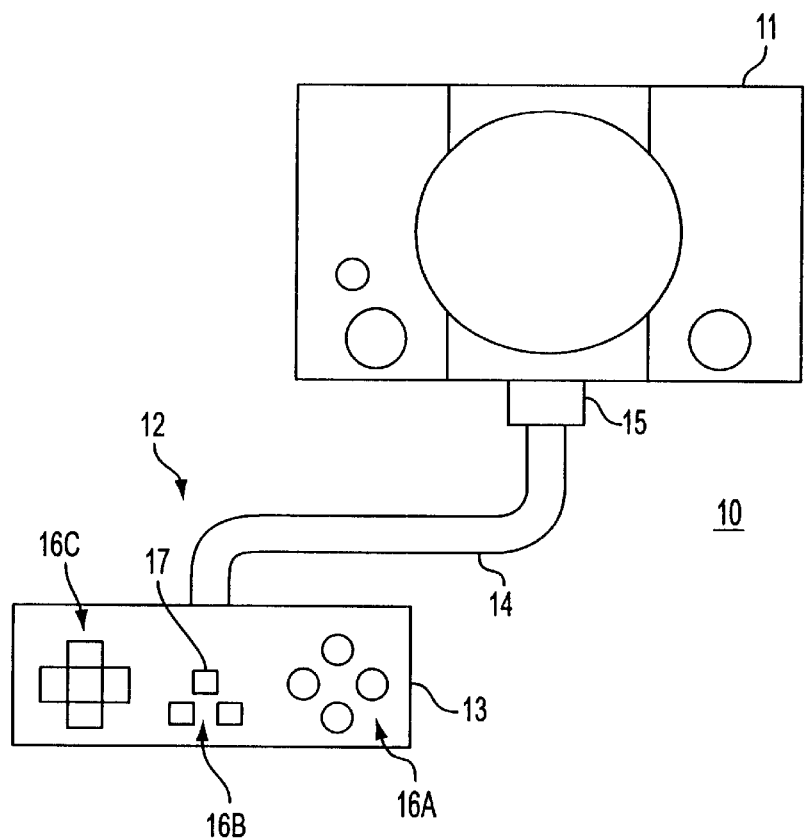
FIG. 2 shows the overall game system according to one embodiment of the invention.

In FIG. 2, game system 10 is made up of game machine main unit 11 and game controller 12. Game controller 12 has controller main unit 13 as an operation means, cable 14, which adopts an optical fiber as a data transmission means, and connector 15 for detachably connecting said cable 14 to game machine main unit 11. Data is sent and received with game machine main unit 11 via cable 14 and connector 15. Controller main unit 13 is formed from input unit 16, which consists of buttons 16A–16C, and output unit 17, which consists of lamps.

Figure 3:
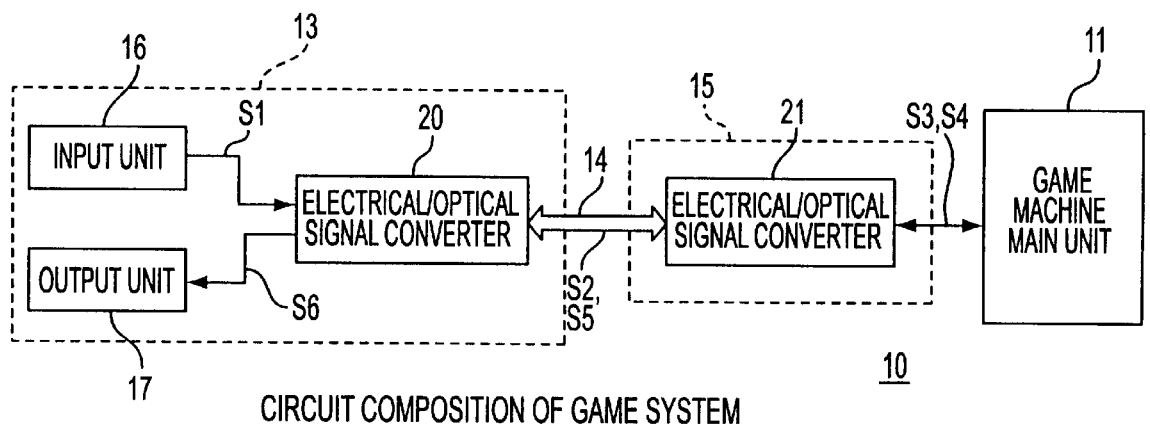
FIG. 3 is a block diagram showing the circuitry of the game system.

As shown in FIG. 3, when the user presses the desired button of input unit 16 among buttons 16A–16C, input unit 16 outputs to electrical/optical signal converter 20 electrical-signal operation information S1 corresponding to the specified content. Electrical/optical signal converter 20 converts electrical-signal operation information S1 to optical-signal operation information S2, which it outputs to connector 15 via the optical fiber of cable 14. Connector 15, which has electrical/optical signal converter 21, converts the input optical-signal operation information S2 to electrical-signal operation information S3 by electrical/optical signal converter 21 and outputs it to game machine main unit 11. Game machine main unit 11 causes the game to proceed in accordance with this operation information S3 by reflecting the operation information S3 in the content of the game.

In response, game machine main unit 11 outputs to connector 15 feedback information S4 consisting of electrical signals with the desired timing that corresponds to the progress of the game. Connector 15 converts the electrical-signal feedback information S4 to optical-signal feedback information S5 by electrical/optical signal converter 21 and outputs it to electrical/optical signal converter 20 of controller main unit 13 via the optical fiber of cable 14. Electrical/optical signal converter 20 converts optical-signal feedback information S5 to electrical-signal feedback information S6, which it outputs to output unit 17. Output unit 17 lights up or turns off lamps in accordance with feedback information S6.

Figure 1:
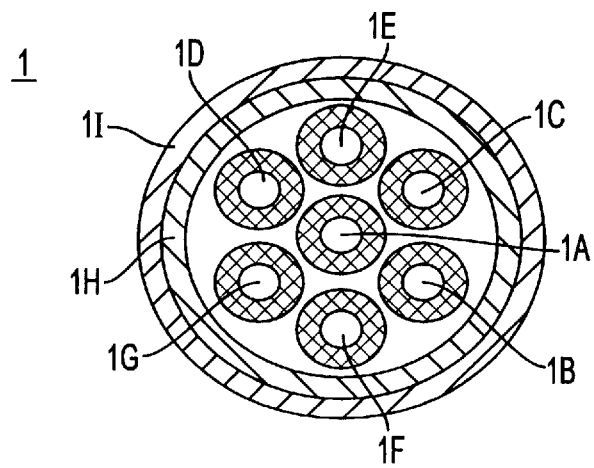
FIG. 1 is a cross-section view of a conventional prior art cable.
Figure 4:
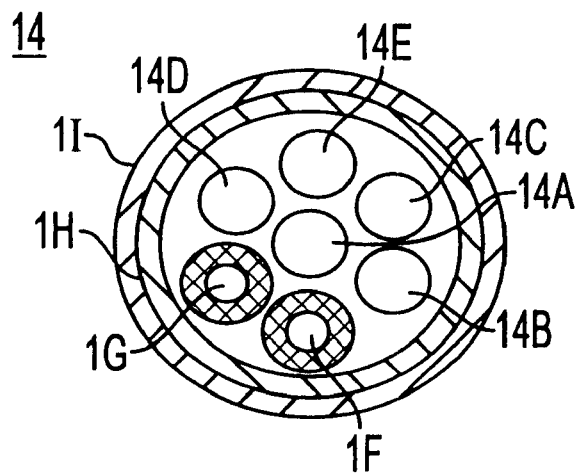
FIG. 4 shows a cross-section of the cable of the invention.

FIG. 4, whose corresponding parts are labeled as in FIG. 1, shows a cross-sectional view of cable 14. Cable 14 has optical fibers 14A–14E for transmitting optical signals and electrically conductive wires 1F–1H for transmitting electrical signals. In cable 14, optical fiber 14A is arranged along the central axis of cable 14, and is surrounded by optical fibers 14B–14E and electrically conductive wires 1F and 1G so that they are adjacent to optical fiber 14A.

The periphery of each of electrically conductive wires 1F and 1G is covered with an insulating substance to prevent them from coming into contact with each other and shorting out. In contrast to this, there is no need to cover optical fibers 14A–14E with an insulating substance, because the transmission of optical signals is not affected even if they come into contact with each other. Therefore optical fibers 14A–14E are thinner than electrically conductive wires 1F and 1G, which makes the entire cable 14 thinner. Given the desired strength, cable 14 is more flexible the thinner it is, so the ease of use of game controller 12 can be improved by making said cable 14 narrower.

In cable 14, the periphery of optical fibers 14B–14E and electrically conductive wires 1F and 1G is covered with electrically conductive wire 1H, which is mesh-woven into a cylindrical shape, and its periphery in turn is covered with vinyl cover 1I, which is an insulating substance; in this way the interior of cable 14 is protected from physical forces and electromagnetic-wave noise from outside.

A serial communication method for avoiding the influence of noise from outside is adopted as the communication method between game machine main unit 11 and controller main unit 13. Here, cable 14 realizes serial communication by sending and receiving data using optical fibers 14A and 14B and by exchanging data for controlling the communication using optical fibers 14C–14E.

Optical fiber 14A transmits data R×D from controller main unit 13 to game machine main unit 11. Optical fiber 14B transmits data T×D from game machine main unit 11 to controller main unit 13. Optical fiber 14C transmits communication standard clock SCK from game machine main unit 11 to controller main unit 13. Optical fiber 14D transmits communication enable signal DTR from game machine main unit 11 to controller main unit 13. Optical fiber 14E transmits communication completion signal DSR from controller main unit 13 to game machine main unit 11.

Electrically conductive wire 1F is an electrically conductive wire for an 8-V power source that operates output unit 17 of controller main unit 13. Electrically conductive wire 1G is an electrically conductive wire for power source Vcc which determines the signal level of logical level "1,". Electrically conductive wire 1H is an electrically conductive wire for grounding line GND which determines the signal level of logical level "0."

Figure 5:
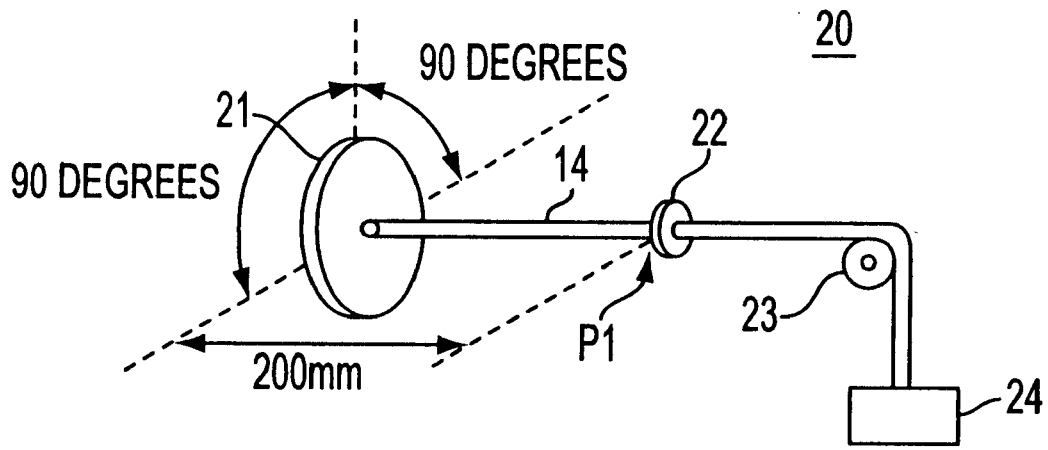
FIG. 5 shows the cable twisting testing device of the invention.

FIG. 5 shows twisting testing device 20 which is used when measuring the strength of cable 14. In twisting testing device 20, one end of cable 14 is attached to twisting plate 21. Fixed plate 22 is attached to position P1 located 200 mm from the one end of cable 14, and position P1 of cable 14 is held fast. Twisting device 20 applies a force to cable 14 in the pulling direction by suspending a 500-gf load 24 on the other end of cable 14 via pulley 23.

In this state, twisting testing device 20 performs twisting 10,000 times at the rate of 20 times per minute, where one time means a test in which twisting plate is twisted 90 degrees left and right. One then checks for any wire break or other abnormality in optical fibers 14A–14E and electrically conductive wires 1F–1H of cable 14. A cable 14 in which no abnormality is found, is used.

FIG. 6 and FIG. 7 show the shape of connector 15. Controller main unit 13 is attached to one end of cable 14, and connector 15 is attached to the other end. The user can play the game by connecting connector 15 to game machine main unit 11. Connector 15 consists of insertion part 30, whose outer shell is formed from ABS plastic and which is for inserting into game machine main unit 11, and support part or housing 31, which accommodates an electrical/optical signal converter, etc. Eight signal pins 32A–32H are formed protruding from insertion part 30. Ridge 33 is formed around the periphery of these eight signal pins 32A–32H.

As shown in FIG. 8, connector connection part 40 is formed on game machine main unit 11. Controller main unit 13 is detachably connected to game machine main unit 11 by inserting said connector connection part 40 into connector 15. Connector connection part 40 consists of eight cylindrical depressions 41A–41H and groove 42, which is formed so as to surround the depressions 41A–41H. Contacts 43A–43H are attached on the side near the base of cylindrical depressions 41A–41H.

When the user inserts connector 15 into connector connection part 40 of game machine main unit 11, signal pins 32A–32H are inserted into corresponding depressions 41A–41H and ridge 33 is inserted into groove 42, thereby causing signal pins 32A–32H to make contact and conduct electricity with contacts 43A–43H of depressions 41A–41H.

FIG. 9, shows the internal structure of connector 15 which is a cross-sectional view of connector 15. Signal pin 32A transmits data RxD from controller main unit 13 to game machine main unit 11. Signal pin 32B transmits data TxD from game machine main unit 11 to controller main unit 13. Signal pin 32C transmits communication standard clock SCK from game machine main unit 11 to controller main unit 13. Signal pin 32D transmits communication enable signal DTR from game machine main unit 11 to controller main unit 13. Signal pin 32E transmits communication completion signal DSR from controller main unit 13 to game machine main unit 11. Signal pin 32F carries the current of an 8-V power source. Signal pin 32G carries the current of power source Vcc, and signal pin 32H is for the grounding line GND.

Signal pins 32A–32E are connected respectively to optical fibers 14A–14E via electrical/optical signal converters 21A–21E, and signal pins 32F–32H are connected directly to respective corresponding electrically conductive wires 1F–1H. Among electrical/optical signal converters 21A–21E, electrical/optical signal converters 21A and 21E convert the optical signals input from optical fibers 14A and 14E to electrical signals, which it outputs to game machine main unit 11 via signal pins 32A and 32E, while electrical/optical signal converters 21B, 21C, and 21D convert the electrical signals input via signal pins 32B, 32C, and 32D from game machine main unit 11 to optical signals, which it outputs to optical fibers 14B, 14C, and 14D, respectively.

Optical fibers 14A–14E might not accurately transmit optical signals unless their bending radius is greater than a desired value (hereafter called the minimum bending radius). Therefore it is necessary that in connector 15 the optical fibers 14A–14E be arranged so that the bending radius of optical fibers 14A–14E is greater than the minimum bending radius.

Specifically, in connector 15, optical fiber guides 51A–51E are arranged in prescribed positions near optical fibers 14A–14E, respectively. Optical fiber guides 51F and 51G are arranged so as to hold between them optical fibers 14A–14E in the prescribed position near cable 14. Optical fibers 14A–14E are arranged along optical fiber guides 51A–51G; this prevents said optical fibers 14A–14E from bending with a radius smaller than the minimum bending radius. In this way, optical fibers 14A–14E and electrically conductive wires 1F–1H are made to converge by optical fiber guides 51A–51G and are accommodated in cable 14. Cable 14 is attached securely to the inside of connector 31 by cable anchoring means 52.

During use, bending stress arises in cable 14 near where it protrudes to the outside from connector 15. Therefore, in connector 15, cable guide 53 is formed by causing the parts of supports 31 that touch cable 14 to bend toward the inside of connector 15 with the prescribed radius, avoiding a concentration of bending stress in the specified parts of cable 14.

Figure 10:
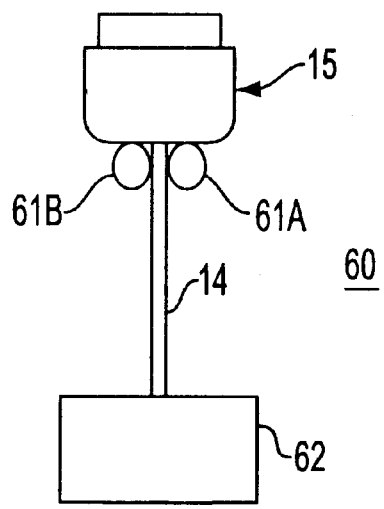
FIG. 10 shows the connector tensile strength testing device.

FIG. 10 shows tensile strength testing device 60 which measures the tensile strength in the contact parts of connector 15 and cable 14. With this tensile strength testing device 60, connector 15 is held fast by connector anchoring fixtures 61A and 61B, 10-kgf load 62 is applied to the other end of cable 14 for 1 minute, then it is checked whether there is any abnormality in cable 14 and connector 15.

Figure 11:
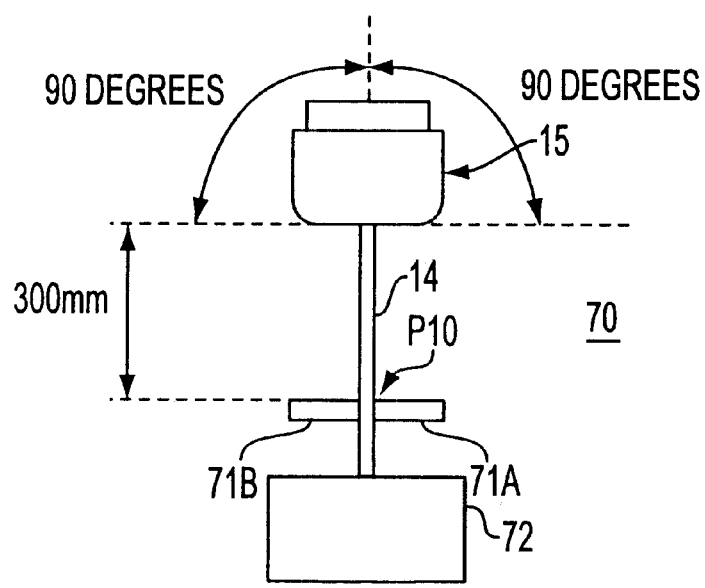
FIG. 11 shows the connector bending strength testing device.

FIG. 11 shows bending strength testing device 70 which measures the bending strength in the contact parts of connector 15 and cable 14. With bending strength testing device 70, position P10 is located 300 mm from the contact position of connector 15 and cable 14 is held fast by cable steady brace 71, and 500-gf load 72 is suspended on the other end of cable 14. In this state, bending strength testing device 70 performs bending 20,000 times at the rate of 40 times per minute, where one time means a test in which connector 15 is bent 90 degrees left and right; then one checks for any wire break or other abnormality in cable 14. By performing such testing, one can assess the bending stress of cable 14 that will arise in actual use.

Figure 12:
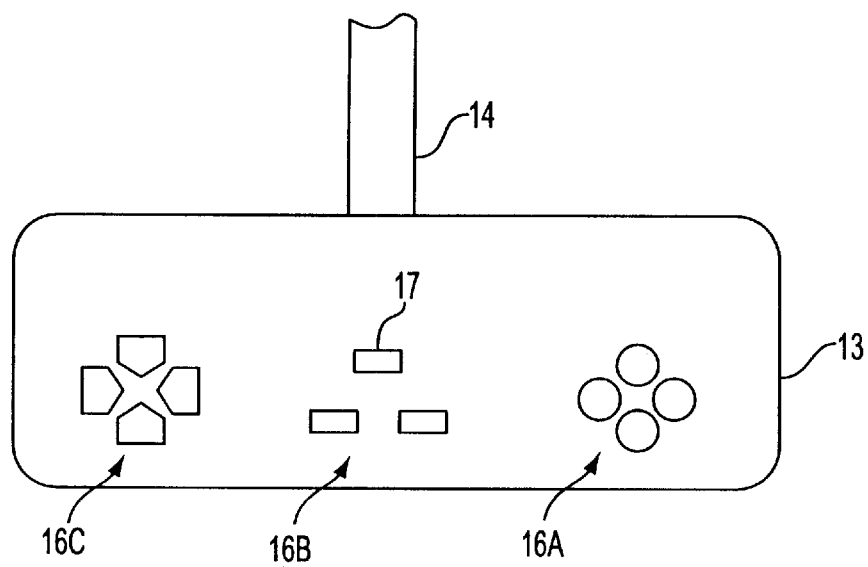
FIG. 12 shows the shape of the controller main unit.

FIG. 12 shows the shape of controller main unit 13. Formed on controller main unit 13 are input part 16, which consists of button keys 16A and 16B and cursor keys 16C, and output unit 17, which consists of lamps. Therefore if the user presses the desired key in input unit 16, controller main unit 13 generates data corresponding to this operation information and outputs it to game machine main unit 11 via cable 14. Conversely, when instruction data for turning the lamps of output unit 17 on or off is sent from game machine main unit 11, controller main unit 13 turns the lamps of output unit 17 on or off in accordance with this instruction data.

Figure 13:
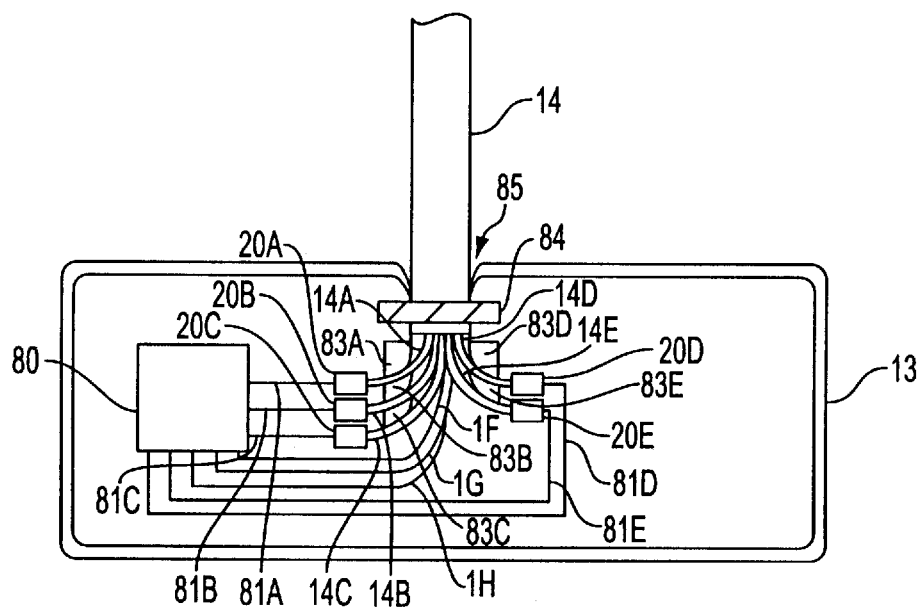
FIG. 13 shows a cross-section of the controller main unit.

FIG. 13 shows the internal structure of controller main unit 13 which is a cross-sectional view of the controller main unit 13. Microprocessor 80, which controls controller main unit 13 is connected to input unit 16 (FIG. 12) and output unit 17 (FIG. 12) and is connected to electrically conductive wires 81A–81E and 1F–1H. Of these, optical fibers 14A–14E are connected to electrically conductive wires 81A–81E via electrical/optical signal converters 20A–20E, respectively.

Operation information input by the user is supplied from input unit 16 to microprocessor 80. Microprocessor 80 performs the prescribed data processing on the operation information and outputs it to electrical/optical signal converters 20A and 20E via corresponding electrically conductive wires 81A and 81E. Electrical/optical signal converters 20A and 20E convert the input electrical signals to optical signals and output them to game machine main unit 11 via optical fibers 14A and 14E.

Conversely, feedback information transmitted from game machine main unit 11 via optical fibers 14B, 14C, and 14D are input to electrical/optical signal converters 20B, 20C, and 20D. Electrical/optical signal converters 20B, 20C, and 20D convert the input optical signals to electrical signals and output them to microprocessor 80 via electrically conductive wires 81B, 81C, and 81D, respectively. Based on this feedback information, microprocessor 80 controls the entire controller main unit 13, turning the lamps of output unit 17 on and off.

In controller main unit 13, as in connector 15, optical fibers 14A–14E are arranged so that the bending radius of said optical fibers 14A–14E is greater than the minimum bending radius. Specifically, in controller main unit 13, optical fiber guides 83A–83E are arranged in prescribed positions near optical fibers 14A–14E. Optical fibers 14A–14E are aligned along optical fiber guides 83A–83E, thereby preventing optical fibers 14A–14E from bending with a bending radius smaller than the minimum bending radius. In this way, optical fibers 14A–14E and electrically conductive wires 1F–1H are made to converge into cable 14 and are accommodated in said cable 14. Cable 14 is attached securely to controller main unit 13 by cable anchoring means 84.

During use, bending stress arises in cable 14 near where it protrudes to the outside from controller main unit 13. Therefore, in controller main unit 13, in the enclosure of controller main unit 13, cable guide 85 is formed by causing the parts that touch cable 14 to bend toward the inside, avoiding a concentration of bending stress in cable 14.

Figure 14:
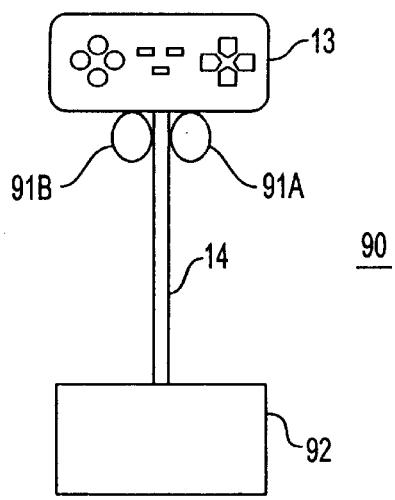
FIG. 14 shows the controller main unit tensile strength testing device.

FIG. 14 shows tensile strength testing device 90 that measures the tensile strength in the contact parts of controller main unit 13 and cable 14. With this tensile strength testing device 90, as with tensile strength testing device 60 (FIG. 10), controller main unit 13 is held fast by controller main unit anchoring means 91A and 91B. A 10-kgf load 92 is applied to the other end of cable 14 for 1 minute. It is then checked to determine if there is any abnormality in cable 14 and controller main unit 13.

Figure 15:
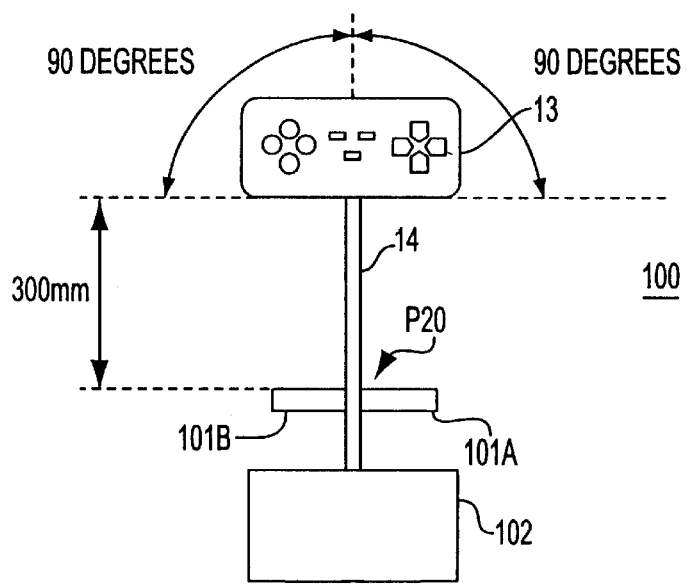
FIG. 15 shows the controller main unit bending strength testing device.

FIG. 15 shows bending strength testing device 100 that measures the bending strength in the contact parts of controller main unit 13 and cable 14. With bending strength testing device 100, as with bending strength testing device 70 (FIG. 11), position P20 located 300 mm from the contact position of controller main unit 13 and cable 14 is held fast by cable steady brace 101, and load 102 is suspended on the other end of cable 14. In this state, bending strength testing device 100 performs bending 20,000 times at the rate of 40 times per minute, where one time means a test in which controller main unit 13 is bent 90 degrees left and right. One then checks for any wire break or other abnormality in cable 14. By performing such testing, one can assess the bending stress of cable 14 that will arise in actual use.

In the above configuration, during sending, controller main unit 13 converts the electrical-signal operation information S1 input from input unit 16 to electrical-signal operation information S2 by electrical/optical signal converter 20 and outputs it to connector 15 via cable 14, which consists of optical fibers. Connector 15 converts the input optical-signal operation information S2 to electrical-signal operation information S3 by electrical/optical signal converter 21 and outputs it to game machine main unit 11. Game machine main unit 11 causes the game to proceed in accordance with this operation information S3.

In response to this, electrical-signal feedback information output from game machine main unit 11 is input to connector 15. Connector 15 converts electrical-signal feedback information S4 to optical-signal feedback information S5 by electrical/optical signal converter 21 and outputs it to controller main unit 13 via cable 14, which consists of optical fibers. Controller main unit 13 converts optical-signal feedback information S5 to electrical-signal feedback information S6 by electrical/optical signal converter 20, and information in accordance with said feedback information S6 is conveyed to the user via output unit 17.

In this way a connection is made between controller main unit 13 and game machine main unit 11 via optical fibers 14A–14E. During communication, by converting the electrical signals of the transmission object to optical signals and transmitting the optical signals back and forth via optical fibers 14A–14E, no electromagnetic-wave noise is generated, even at high frequency, as happens when electrical signals are transmitted via electrically conductive wires 1A–1E, Thus, there is no need to limit the frequency of the optical signals, that is, the communication speed, and accordingly communication can be done at a higher rate than previously.

Even if optical fibers 14A–14E are made long, the rate of attenuation in the signal level they transmit is much smaller than for electrically conductive wires 1A–1E. Therefore cable 14, which consists of optical fibers 14A–14E, can be made longer than conventional cable 1 which consists of electrically conductive wires 1A–1E.

Optical fibers 14A–14E of cable 14 are connected to game machine main unit 11 via electrical/optical signal converters 21A–21E of connector 15, and optical signals input from cable 14 are converted to electrical signals by said electrical/optical signal converters 21A–21E and are output to game machine main unit 11, while electrical signals input from game machine main unit 11 are converted to optical signals and are output to cable 14; in this way, communication is realized using optical fibers 14A–14E in a simple composition, without modifying the composition of game machine main unit 11.

Inside connector 15 and controller main unit 13, optical fiber guides 51A–51G and 83A–83E are arranged in prescribed positions near optical fibers 14A–14E, respectively, and optical fibers 14A–14E are aligned along optical fiber guides 51A–51G and 83A–83E. This makes it possible to prevent optical fibers 14A–14E from bending at a bending radius smaller than the minimum bending radius, and therefore optical signals can be transmitted more accurately than if optical fiber guides 51A–51G and 83A–83E were not provided.

By the above configuration, a connection is made between controller main unit 13 and game machine main unit 11 via cable 14, which consists of optical fibers 14A–14E. During communication, by converting the electrical signals of the transmission object to optical signals and transmitting said optical signals via optical fibers 14A–14E, no electromagnetic-wave noise is generated as happens when electrical signals are transmitted via electrically conductive wires 1A–1E. Thus, to the extent that there is no need, as there was previously, to limit the frequency of the optical signals, that is, the communication speed, the communication rate can be improved.

In the above-described embodiment, five types of data are each transmitted via a corresponding optical fiber 14A–14E. However, this invention is not limited to the features of that embodiment. It will be just as effective as in the above-described case, if two types of data transmitted from controller main unit 13 to game machine main unit 11 are composed and this composite data is transmitted by one optical fiber, while three types of data transmitted from game machine main unit 11 to controller main unit 13 are composed and this composite data is transmitted by one optical fiber.

Figure 16:
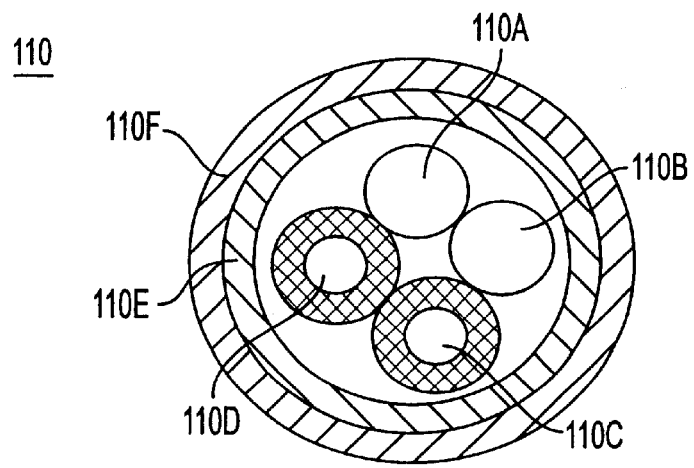
FIG. 16 shows a cross-section of the cable according to another embodiment.

This is specifically explained below using FIG. 16 through FIG. 18. FIG. 16 is a cross-sectional view of cable 110 according to a further embodiment. Cable 110 has optical fibers 110A and 110B for transmitting optical signals and electrically conductive wires 110C–110E for transmitting electrical signals, and these are arranged so as to be adjacent to each other.

Optical fiber 110A is made so that it transmits a composite signal generated by combining data TxD, communication standard clock SCK, and communication enable signal DTR, which are transmitted from game machine main unit 11 to controller main unit 13. Optical fiber 110B is made so that it transmits a composite signal generated by combining data RxD and communication completion signal DSR, which are transmitted from controller main unit 13 to game machine main unit 11.

Electrically conductive wire 110C is an electrically conductive wire for an 8-V power source, and electrically conductive wire 110D is an electrically conductive wire for power source Vcc. In cable 110, the periphery of optical fibers 110A and 110B and electrically conductive wires 110C and 110D is covered with electrically conductive wire 110E for grounding line GND, and its periphery in turn is covered with vinyl cover 110F, which is an insulating substance. By thus reducing the number of optical fibers 110A and 110B housed in cable 110, cable 110 can be made thinner.

Figure 17:
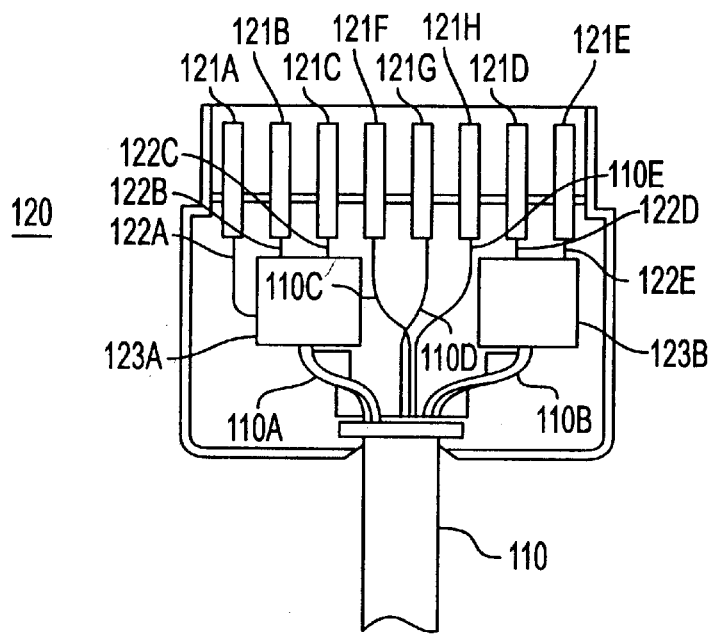
FIG. 17 shows a cross-section of the connector according to another embodiment.

Next, the internal structure of connector 120 is described using FIG. 17, which is a cross-sectional view of said connector 120. Signal pin 121A transmits data TxD from game machine main unit 11 to controller main unit 13. Signal pin 121B transmits communication standard clock SCK from game machine main unit 11 to controller main unit 13, and signal pin 121C transmits communication enable signal DTR from game machine main unit 11 to controller main unit 13.

Signal pin 121D transmits data RxD from controller main unit 13 to game machine main unit 11. Signal pin 121E transmits communication completion signal DSR from controller main unit 13 to game machine main unit 11. Signal pin 121F carries the current of an 8-V power source. Signal pin 121G carries the current of power source Vcc, and signal pin 121H is for the grounding line GND.

Signal pin 121A is connected to electrical/optical signal conversion synthesizer 123A via electrically conductive wire 122A. Signal pin 121B is connected to electrical/optical signal conversion synthesizer 123A via electrically conductive wire 122B. Signal pin 121C is connected to electrical/optical signal conversion synthesizer 123A via electrically conductive wire 122C. Signal pin 121D is connected to electrical/optical signal separation converter 123B via electrically conductive wire 122D, and signal pin 121E is connected to electrical/optical signal separation converter 123B via electrically conductive wire 122E. Signal pins 121F–121H are directly connected to the corresponding electrically conductive wires 110C–110E.

Electrical/optical signal conversion synthesizer 123A is connected to optical fiber 110A. It allocates light of a different wavelength to data TxD, which is input from game machine main unit 11 via signal pin 121A and electrically conductive wire 122A, communication standard clock SCK, which is input via signal pin 121B and electrically conductive wire 122B, and communication enable signal DTR, which is input via signal pin 121C and electrically conductive wire 122C. By converting them to optical signals and combining them, it generates a composite signal, and it outputs the composite signal to optical fiber 110A.

Electrical/optical signal separation converter 123B is connected to optical fiber 110B. After it separates the composite signal input from optical fiber 110B into optical signals of two wavelengths by, for example, passing it through a prism or other spectroscope, it converts them respectively to two electrical signals, and of these, it outputs data RxD to game machine main unit 11 via electrically conductive wire 122D and signal pin 121D, and it outputs communication completion signal DSR to game machine main unit 11 via electrically conductive wire 122E and signal pin 121E.

Figure 18:
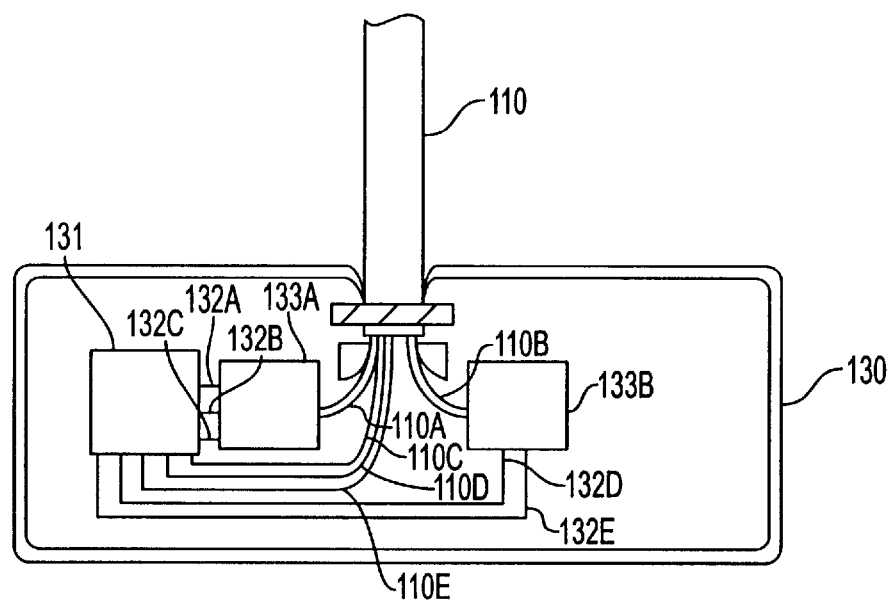
FIG. 18 shows a cross-section of the controller main unit according to another embodiment.

The internal structure of controller main unit 130 is shown in FIG. 18, which is a cross-sectional view of said controller main unit 130. Microprocessor 131, which controls controller main unit 130, is connected to electrically conductive wires 132A–132E and 110C–110E. Of these, electrically conductive wires 132A–132C are connected to optical fiber 110A via electrical/optical signal separation converter 133A, while electrically conductive wires 132D and 132E are connected to optical fiber 110B via electrical/optical signal conversion synthesizer 133B.

Electrical/optical signal separation converter 133A separates the composite signal input from game machine main unit 11 via optical fiber 110A into optical signals of three wavelengths by passing it through a spectroscope. It then converts each of them to an electrical signal, and outputs the thus obtained data TxD, communication standard clock SCK, and communication enable signal DTR to microprocessor 131 via corresponding electrically conductive wires 132A–132C.

Electrical/optical signal conversion synthesizer 133B allocates light of a different wavelength to data RxD and communication completion signal DSR supplied from microprocessor 131 via electrically conductive wires 132D and 132E. After converting them to optical signals, it combines them to generate a composite signal, and it outputs said composite signal to optical fiber 110B. In the above-described embodiment, the invention is applied to game controller 12 for operating game machine main unit 11. However, as in the above-described case, if this invention is applied to an external operation device that operates various other types of operation objects, such as, for example, external operation devices for operating a computer, it will be just as effective.

As described above, with this invention, the operation means is connected to the operation object via optical fiber, and by converting electrical signals of the transmission object to optical signals during communication and transmitting the optical signals via an optical fiber, even if the frequency of the optical signals is high, no electromagnetic-wave noise is generated as happens when the operation means is connected via electrically conductive wires, so there is no need to limit the frequency, that is, the communication speed, and thus-communication can be done at a higher rate than previously.

What is claimed is:

1. An external operation device connected to an operation object and by which the operation object is operated said external operation device comprising:

an operation means that converts electrical signals of a transmission object, generated in accordance with operation by a user input, to optical signals by an internal electro-optical signal converter and outputs said optical signals to said operation object, and converts received optical signals transmitted from said operation object to electrical signals by said electro-optical signal converter and outputs information in accordance with said converted electrical signals, an optical fiber, one end of which is attached to said operation means, that transmits optical signals between said operation means and said operation object, electrical conductive wire for transmitting electrical signals, and having one end of which is attached to said operation means, and a connection means provided on an other end of said optical fiber and said electrical conductive wire, said connection means is detachably connected to said operation object and converts optical signals transmitted from said operation means via said optical fiber to electrical signals by an internal electro-optical signal converter and outputs said electrical signals to said operation object, and converts electrical signals supplied from said operation object to optical signals by said electro-optical signal converter and outputs said optical signals to said operation means via said optical fiber, and couples said electrical conductive wire to said operation object, wherein said external operation device sends operation information input by a user to said operation object, and said external operation device informing the user by receiving feedback information from said operation object, and wherein said operation object is a game machine.

2. An entertainment system comprising:
a game machine main unit,
a user interface game controller, and
cable data transmission means between said game machine main unit and said user interface game controller, said cable data transmission means including an optical cable,
an electrically conductive cable,
a connector provided on an end of said optical fiber and said electrical conductive wire, said connector is detachably connected to at least one of said game machine main unit and said user interface game controller,
wherein signals that can be a source of electromagnetic-wave noise are transmitted via said optical cable and signals that cannot be a source of electromagnetic-wave noise are transmitted via said electrically conductive cable.

3. An entertainment system according to claim 2 wherein said signals that can be a source of electromagnetic-wave noise consist of high-frequency alternating current, and
said signals that cannot be a source of electromagnetic-wave noise consist of direct current.

4. An entertainment system according to claim 2 wherein said signals that can be a source of electromagnetic-wave noise consist of power-source current or ground current.

5. An entertainment system according to claim 2 wherein
an optical fiber guide is arranged within a housing of said connector along multiple optical fibers that constitute said optical cable, a bending radius of said optical fiber being restricted to be at least as large as a minimum bending radius at which optical transmission will not degrade.

6. An entertainment system according to claim 2 wherein
said connector having an electrical/optical signal conversion synthesizer which converts multiple electrical data signals into a single composite optical signal, and it is output to one optical fiber.

7. An entertainment system according to claim 6 wherein said electrical/optical signal conversion synthesizer converts to an optical signal by allocating light of a different wavelength to each different electrical data signal, and generates a composite optical signal by putting these optical signals together.

8. An entertainment system according to claim 2 wherein
said connector has an electrical/optical signal separation converter, and a composite optical signal composed of multiple data signals is converted to original multiple electrical data signals by said electrical/optical signal separation converter and is output.

9. An entertainment system according to claim 8 wherein said electrical/optical signal separation converter has a spectroscope, the composite optical signal that is input is separated into optical signals of different wavelengths, and the separated optical signals are converted into electrical signals to generate the original multiple electrical data signals.

10. An entertainment system according to claim 2 wherein
a means to avoid a concentration of bending stress is provided where said connector and said cable connect.

11. An entertainment system according to claim 10 wherein said means to avoid a concentration of bending stress causes a housing of said connector to curve inward at a prescribed radius at a part that comes into contact with said cable data transmission means.

* * * * *